US012776269B2

(12) United States Patent
Woo et al.

(10) Patent No.: US 12,776,269 B2
(45) Date of Patent: Oct. 27, 2026

(54) PIXEL OF A DISPLAY DEVICE AND DISPLAY DEVICE

(71) Applicant: Samsung Display Co., LTD., Yongin-si (KR)

(72) Inventors: Minkyu Woo, Yongin-si (KR); Kyunghoon Chung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/013,024

(22) Filed: Jan. 8, 2025

(65) Prior Publication Data

US 2025/0308449 A1 Oct. 2, 2025

(30) Foreign Application Priority Data

Mar. 27, 2024 (KR) ........................ 10-2024-0041557

(51) Int. Cl.
*G09G 3/3233* (2016.01)
*G09G 3/32* (2016.01)

(52) U.S. Cl.
CPC ............ *G09G 3/3233* (2013.01); *G09G 3/32* (2013.01); *G09G 2300/0852* (2013.01); *G09G 2300/0861* (2013.01); *G09G 2310/08* (2013.01); *G09G 2320/0242* (2013.01); *G09G 2330/021* (2013.01)

(58) Field of Classification Search
CPC ...... G09G 3/3233; G09G 3/3291; G09G 3/32; H05B 45/325
See application file for complete search history.

(56) References Cited

U.S. PATENT DOCUMENTS

| | | | | |
|---|---|---|---|---|
| 11,790,836 | B2 * | 10/2023 | Kim | G09G 3/2014 345/691 |
| 2019/0325806 | A1 * | 10/2019 | Hashimoto | G09G 3/2014 |
| 2022/0418068 | A1 * | 12/2022 | Halbritter | G09G 3/32 |

FOREIGN PATENT DOCUMENTS

| | | |
|---|---|---|
| KR | 1020220052265 A | 4/2022 |
| KR | 1020230011844 A | 1/2023 |

* cited by examiner

*Primary Examiner* — Sardis F Azongha
(74) *Attorney, Agent, or Firm* — CANTOR COLBURN LLP

(57) ABSTRACT

A pixel of a display device includes a light emitting element, a constant current generating circuit which generates a constant current, a pulse generating circuit which generates a pulse signal, and an emission transistor which provides the constant current to the light emitting element in response to the pulse signal. The pulse generating circuit includes a plurality of inverters connected to each other in series, where the plurality of inverters outputs the pulse signal at a pulse output node based on a voltage of a first node, and a feedback capacitor including a first electrode connected to the first node, and a second electrode connected to the pulse output node.

20 Claims, 15 Drawing Sheets

PIXEL OF A DISPLAY DEVICE AND DISPLAY DEVICE

This application claims priority to Korean Patent Application No. 10-2024-0041557, filed on Mar. 27, 2024, and all the benefits accruing therefrom under 35 U.S.C. § 119, the content of which in its entirety is herein incorporated by reference.

BACKGROUND

1. Field

Embodiments of the invention relate to a display device, and more particularly to a pixel that drives a light emitting element in a pulse width modulation (PWM) method, and a display device including the pixel.

2. Description of the Related Art

A display device may display an image by driving a light emitting element, such as a micro light emitting diode (μLED) or an organic light emitting diode (OLED), in a pulse amplitude modulation (PAM) method or a pulse width modulation (PWM) method. In the PAM method, a gray level may be represented by adjusting an amount (or an amplitude) of a driving current provided to the light emitting element. In the PWM method, the gray level may be represented by adjusting a time (or a pulse width) during which the driving current is provided to the light emitting element.

SUMMARY

A wavelength of light emitted by a micro light emitting diode (μLED) may be shifted based on the amount of the driving current. Thus, in a case where the light emitting element such as the μLED is driven in a pulse amplitude modulation (PAM) method, a color shift phenomenon may occur, and an image displayed by the light emitting element may be distorted.

Some embodiments provide a pixel of a display device capable of having an improved image quality.

Some embodiments provide a display device capable of having an improved image quality.

According to embodiments, a pixel of a display device includes a light emitting element, a constant current generating circuit which generates a constant current, a pulse generating circuit which generates a pulse signal, and an emission transistor which provides the constant current to the light emitting element in response to the pulse signal. In such embodiments, the pulse generating circuit includes a plurality of inverters connected to each other in series, where the plurality of inverters outputs the pulse signal at a pulse output node based on a voltage of a first node, and a feedback capacitor including a first electrode connected to the first node, and a second electrode connected to the pulse output node. In embodiments, an emission time of the light emitting element may be determined based on a pulse width of the pulse signal.

In embodiments, the pulse generating circuit may further include a first transistor which applies a first power supply voltage to the first node in response to a voltage of a second node, and a second transistor which applies a second power supply voltage to the first node in response to a scan signal.

In embodiments, the first transistor may include a gate connected to the second node, a first terminal which receives the first power supply voltage, and a second terminal connected to the first node, and the second transistor may include a gate which receives the scan signal, a first terminal which receives the second power supply voltage, and a second terminal connected to the first node.

In embodiments, the first power supply voltage may be a high power supply voltage, the second power supply voltage may be a low power supply voltage, the first transistor may be a P-type metal oxide semiconductor (PMOS) transistor, and the second transistor may be an N-type metal oxide semiconductor (NMOS) transistor.

In embodiments, the first power supply voltage may be a high power supply voltage, the second power supply voltage may be a low power supply voltage, the first transistor may be an NMOS transistor, and the second transistor may be a PMOS transistor.

In embodiments, the pulse generating circuit may further include a third transistor which applies a data voltage to the second node in response to the scan signal.

In embodiments, the pulse generating circuit may further include a fourth transistor which applies a data voltage to the second node in response to an inverted scan signal.

In embodiments, the pulse generating circuit may further include a third transistor which applies a data voltage to the second node in response to the scan signal, and a fourth transistor which applies the data voltage to the second node in response to an inverted scan signal.

In embodiments, the third transistor may include a gate which receives the scan signal, a first terminal connected to the second node, and a second terminal which receives the data voltage, and the fourth transistor may include a gate which receives the inverted scan signal, a first terminal which receives the data voltage, and a second terminal connected to the second node.

In embodiments, the third transistor may be a PMOS transistor, and the fourth transistor may be an NMOS transistor.

In embodiments, the third transistor may be an NMOS transistor, and the fourth transistor may be a PMOS transistor.

In embodiments, the pulse generating circuit may further include a storage capacitor including a first electrode which receives a sweep signal, and a second electrode connected to the second node.

In embodiments, a voltage level of the sweep signal may gradually decrease during a sweep period.

In embodiments, a voltage level of the sweep signal may gradually increase during a sweep period.

In embodiments, the plurality of inverters may include a first inverter which inverts the voltage of the first node, and outputs an inverted voltage to a third node, and a second inverter which inverts a voltage of the third node, and outputs the pulse signal at the pulse output node.

In embodiments, the first inverter may include a fifth transistor including a gate connected to the first node, a first terminal which receives a first power supply voltage, and a second terminal connected to the third node, and a sixth transistor including a gate connected to the first node, a first terminal which receives a second power supply voltage, and a second terminal connected to the third node. In such embodiments, the second inverter may include a seventh transistor including a gate connected to the third node, a first terminal which receives the first power supply voltage, and a second terminal connected to the pulse output node, and an eighth transistor including a gate connected to the third node, a first terminal which receives the second power supply voltage, and a second terminal connected to the pulse output node.

In embodiments, the fifth transistor and the seventh transistor may be PMOS transistors, and the sixth transistor and the eighth transistor may be NMOS transistors.

According to embodiments, a pixel of a display device includes a first transistor including a gate connected to a second node, a first terminal which receives a first power supply voltage, and a second terminal connected to a first node, a second transistor including a gate which receives a scan signal, a first terminal which receives a second power supply voltage, and a second terminal connected to the first node, a third transistor including a gate which receives the scan signal, a first terminal connected to the second node, and a second terminal which receives a data voltage, a fourth transistor including a gate which receives an inverted scan signal, a first terminal which receives the data voltage, and a second terminal connected to the second node, a storage capacitor including a first electrode which receives a sweep signal, and a second electrode connected to the second node, a fifth transistor including a gate connected to the first node, a first terminal which receives the first power supply voltage, and a second terminal connected to a third node, a sixth transistor including a gate connected to the first node, a first terminal which receives the second power supply voltage, and a second terminal connected to the third node, a seventh transistor including a gate connected to the third node, a first terminal which receives the first power supply voltage, and a second terminal connected to a pulse output node, an eighth transistor including a gate connected to the third node, a first terminal which receives the second power supply voltage, and a second terminal connected to the pulse output node, a feedback capacitor including a first electrode connected to the first node, and a second electrode connected to the pulse output node, a ninth transistor including a gate which receives a bias voltage, a first terminal which receives the first power supply voltage, and a second terminal, a tenth transistor including a gate connected to the pulse output node, a first terminal connected to the second terminal of the ninth transistor, and a second terminal, and a light emitting element including an anode connected to the second terminal of the tenth transistor, and a cathode which receives the second power supply voltage.

According to embodiments, a display device includes a display panel including a plurality of pixels, a data driver which provides a data voltage to each of the plurality of pixels, a scan driver which provides a scan signal to each of the plurality of pixels, a sweep driver which provides a sweep signal to each of the plurality of pixels, and a controller which controls the data driver, the scan driver and the sweep driver. In such embodiments, each of the plurality of pixels includes a light emitting element, a constant current generating circuit which generates a constant current, a pulse generating circuit which generates a pulse signal, and an emission transistor which provides the constant current to the light emitting element in response to the pulse signal. In such embodiments, the pulse generating circuit includes a plurality of inverters connected to each other in series, where the plurality of inverters outputs the pulse signal at a pulse output node based on a voltage of a first node, and a feedback capacitor including a first electrode connected to the first node, and a second electrode connected to the pulse output node.

According to embodiments, an electronic device includes a processor configured to provide input image data, and a display device configured to receive the input image data, and to display an image based on the input image data. The display device includes a display panel including a plurality of pixels, a data driver which provides a data voltage to each of the plurality of pixels, a scan driver which provides a scan signal to each of the plurality of pixels, a sweep driver which provides a sweep signal to each of the plurality of pixels, and a controller which control the data driver, the scan driver and the sweep driver. Each of the plurality of pixels includes a light emitting element, a constant current generating circuit which generates a constant current, a pulse generating circuit which generates a pulse signal, and an emission transistor which provides the constant current to the light emitting element in response to the pulse signal. The pulse generating circuit includes a plurality of inverters connected to each other in series, wherein the plurality of inverters outputs the pulse signal at a pulse output node based on a voltage of a first node, and a feedback capacitor including a first electrode connected to the first node, and a second electrode connected to the pulse output node.

As described above, in a display device according to embodiments, each pixel may drive a light emitting element in a pulse width modulation (PWM) method based on a constant current having a constant current level. Thus, a color shift phenomenon may be effectively prevented in the display device. Further, in the pixel of the display device according to embodiments, a pulse generating circuit may include a plurality of inverters connected to each other in series, and a feedback capacitor connected between input and output nodes of the plurality of inverters. Accordingly, a rising (and/or falling) time of a pulse signal may be improved, and an image quality of the display device may be improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
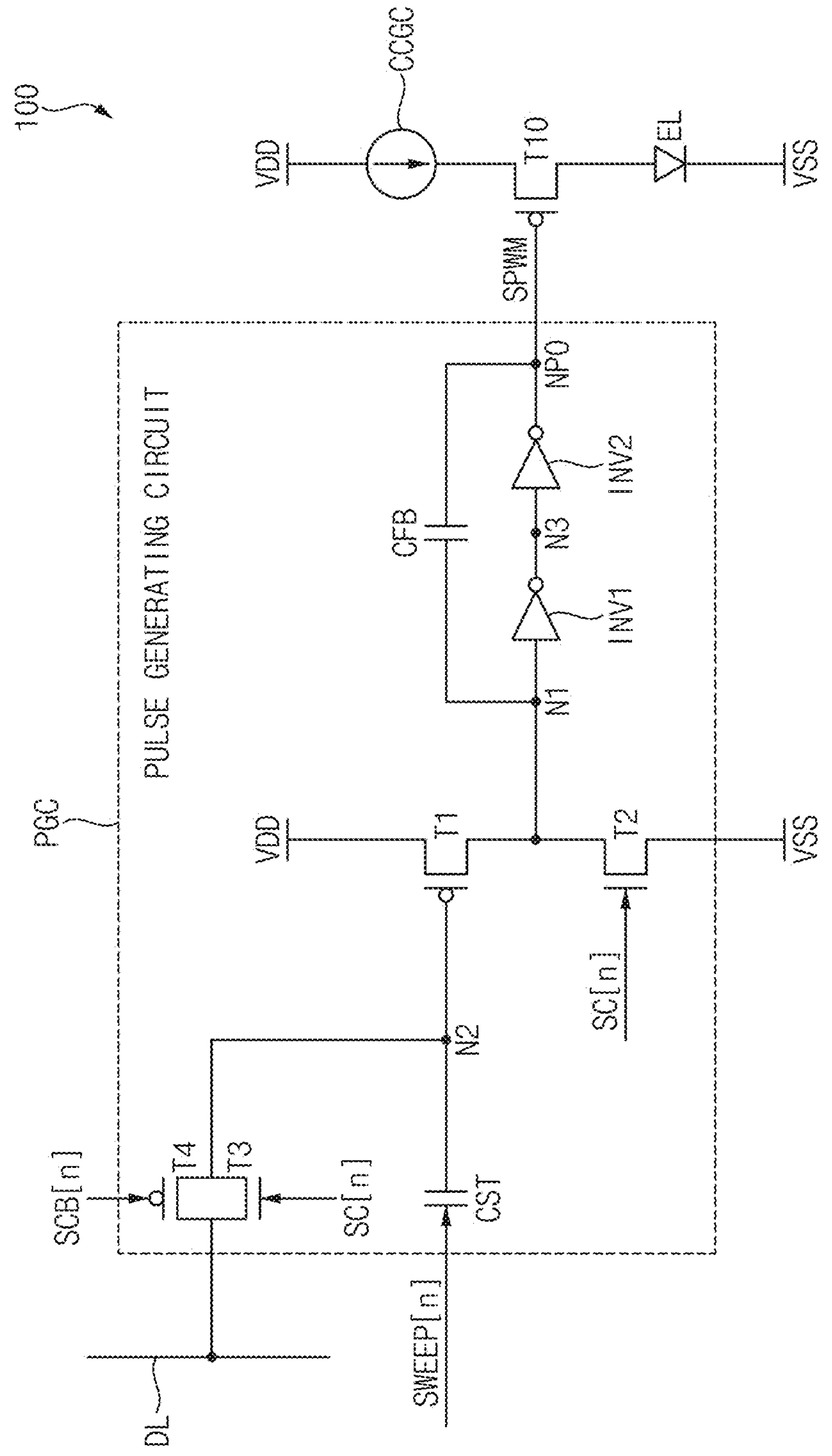
FIG. 1 is a circuit diagram illustrating a pixel of a display device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

Figure 2:
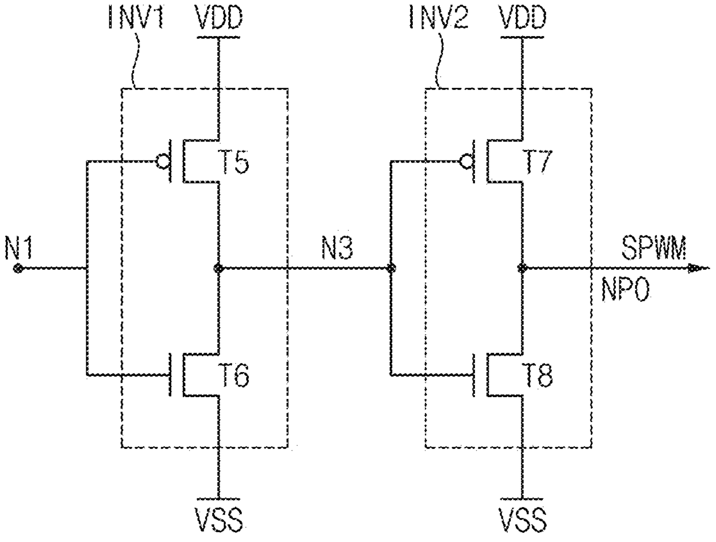
FIG. 2 is a circuit diagram illustrating an example of a plurality of inverters included in a pixel according to embodiments.
Figure 3:
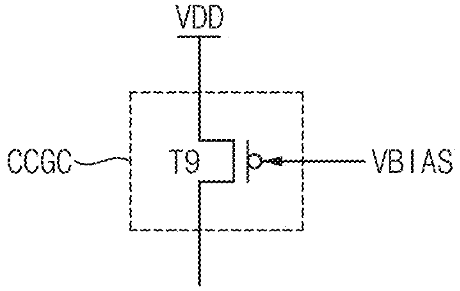
FIG. 3 is a circuit diagram illustrating an example of a constant current generating circuit included in a pixel according to embodiments.

FIG. 1 is a circuit diagram illustrating a pixel of a display device according to embodiments, FIG. 2 is a circuit diagram illustrating an example of a plurality of inverters included in a pixel according to embodiments, and FIG. 3 is a circuit diagram illustrating an example of a constant current generating circuit included in a pixel according to embodiments.

Referring to FIG. 1, a pixel 100 according to embodiments may include a light emitting element EL, a constant current generating circuit CCGC that generates a constant current having a substantially constant current level, a pulse generating circuit PGC that generates a pulse signal SPWM, and an emission transistor T10 that provides the constant current to the light emitting element EL in response to the pulse signal SPWM. The pulse generating circuit PGC may include a plurality of inverters INV1 and INV2 connected to each other in series, and a feedback capacitor CFB connected between an input node (or a first node N1) and an output node (or a pulse output node NPO) of the plurality of inverters INV1 and INV2. In some embodiments, the pulse generating circuit PGC may further include a first transistor T1, a second transistor T2, a third transistor T3, a fourth transistor T4 and a storage capacitor CST.

The third transistor T3 may apply a data voltage of a data line DL to a second node N2 in response to a scan signal SC[n], and the fourth transistor T4 may apply the data voltage of the data line DL to the second node N2 in response to an inverted scan signal SCB[n]. In some embodiments, the inverted scan signal SCB[n] may be a signal inverted from the scan signal SC[n], and each of the scan signal SC[n] and the inverted scan signal SCB[n] may be sequentially applied to a plurality of pixels of a display device on a row-by-row basis. In some embodiments, as illustrated in FIG. 1, the third transistor T3 may be a P-type metal oxide semiconductor (PMOS) transistor, and the fourth transistor T4 may be an N-type metal oxide semiconductor (NMOS) transistor. That is, the third and fourth transistors T3 and T4 may be a complementary metal oxide semiconductor (CMOS) transmission gate that transfers the data voltage in response to the scan signal SC[n] and the inverted scan signal SCB[n]. Further, in some embodiments, the third transistor T3 may include a gate which receives the scan signal SC[n], a first terminal connected to the second node N2, and a second terminal which receives the data voltage, and the fourth transistor T4 may include a gate which receives the inverted scan signal SC[n], a first terminal which receives the data voltage, and a second terminal connected to the second node N2.

Figure 4:
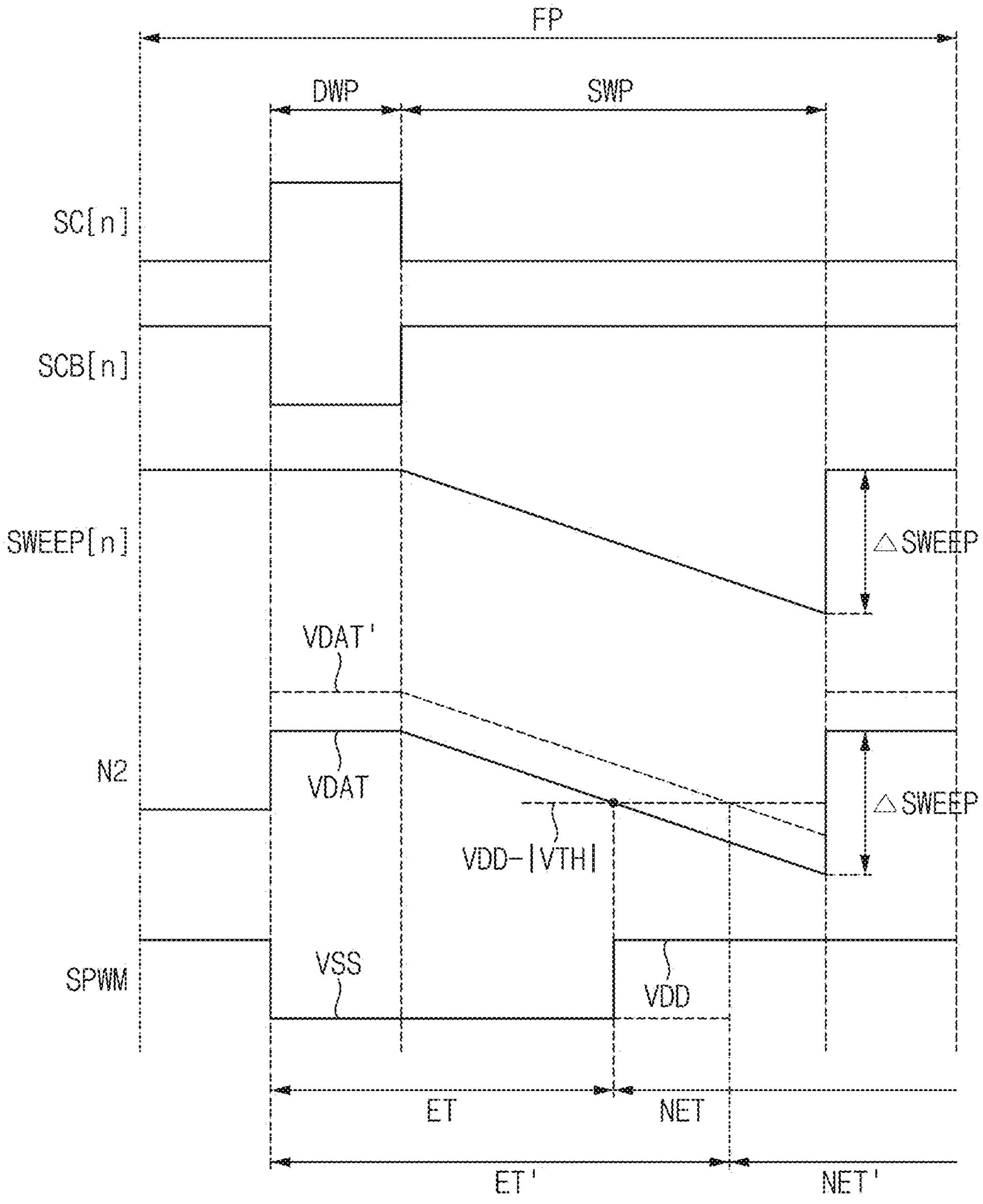
FIG. 4 is a timing diagram for describing an example of an operation of a pixel according to embodiments.

The storage capacitor CST may receive a sweep signal SWEEP [n], and may be connected to the second node N2. In some embodiments, the storage capacitor CST may include a first electrode which receives the sweep signal SWEEP [n], and a second electrode connected to the second node N2. In some embodiments, the sweep signal SWEEP [n] may be sequentially applied to the plurality of pixels of the display device on a row-by-row basis. Further, in some embodiments, as illustrated in FIG. 4, a voltage level of the sweep signal SWEEP [n] may gradually decrease during a sweep period SWP. Thus, by the storage capacitor CST, a voltage of the second node N2 also may gradually decrease from the data voltage during the sweep period SWP.

The first transistor T1 may apply a first power supply voltage VDD to the first node N1 in response to the voltage of the second node N2, and the second transistor T2 may apply a second power supply voltage VSS to the first node N1 in response to the scan signal SC[n]. As will be described below with reference to FIGS. 4 and 5, the second transistor T2 may apply the second power supply voltage VSS to the first node N1 in a data writing period DWP. Further, as will be described below with reference to FIGS. 4 and 7, within the sweep period SWP, when the voltage of the second node N2 becomes lower than a voltage VDD−|VTH| obtained by subtracting an absolute value |VTH| of a threshold voltage of the first transistor T1 from the first power supply voltage VDD, the first transistor T1 may apply the first power supply voltage VDD to the first node N1. In some embodiments, as illustrated in FIG. 1, the first power supply voltage VDD may be a high power supply voltage, the second power supply voltage VSS may be a low power supply voltage, the first transistor T1 may be a PMOS transistor, and the second transistor T2 may be an NMOS transistor. Further, in some embodiments, the first transistor T1 may include a gate connected to the second node N2, a first terminal which receives the first power supply voltage VDD, and a second terminal connected to the first node N1, and the second transistor T2 may include a gate which receives the scan signal SC[n], a first terminal which receives the second power supply voltage VSS, and a second terminal connected to the first node N1.

The plurality of inverters INV1 and INV2 may be connected in series between the first node N1 and the pulse output node NPO, and may output the pulse signal SPWM at the pulse output node NPO based on a voltage of the first node N1. Here, the pulse signal SPWM may be a signal having a pulse width which is adjusted or modulated based on a voltage level of the data voltage, and thus may be referred to as a pulse width modulation (PWM) signal. The pulse generating circuit PGC may include an even number of inverters INV1 and INV2 between the first node N1 and the pulse output node NPO. Thus, the even number of inverters INV1 and INV2 may generate the pulse signal SPWM having a logic level (e.g., a high level or a low level) that is substantially the same as a logic level of the voltage of the first node N1. In such embodiments, since the voltage of the first node N1 is not directly used as the pulse signal SPWM, and the pulse signal SPWM is generated by the even number of inverters INV1 and INV2 based on the voltage of the first node N1, a rising time and/or a falling time of the pulse signal SPWM may be improved or shortened.

In some embodiments, as illustrated in FIG. 1, the pulse generating circuit PGC may include, as the plurality of inverters INV1 and INV2, two inverters INV1 and INV2 connected to each other in series. That is, the pulse generating circuit PGC may include a first inverter INV1 that inverts the voltage of the first node N1 to output the inverted voltage to a third node N3, and a second inverter INV2 that inverts a voltage of the third node N3 to outputs the pulse signal SPWM at the pulse output node NPO.

Further, in some embodiments, each of the first inverter INV1 and the second inverter INV2 may be implemented as a CMOS inverter. In an embodiment, for example, as illustrated in FIG. 2, the first inverter INV1 may include a fifth transistor T5 and a sixth transistor T6 connected in series between a line which transfers the first power supply voltage VDD and a line which transfers the second power supply voltage VSS, and the second inverter INV2 may include a seventh transistor T7 and an eighth transistor T8 connected in series between the line which transfers the first power supply voltage VDD and the line which transfers the second power supply voltage VSS. In some embodiments, the fifth transistor T5 and the seventh transistor T7 may be PMOS transistors, and the sixth transistor T6 and the eighth transistor T8 may be NMOS transistors. In some embodiments, the fifth transistor T5 may include a gate connected to the first node N1, a first terminal which receives the first power supply voltage VDD, and a second terminal connected to the third node N3, and the sixth transistor T6 may include a gate connected to the first node N1, a first terminal which receives the second power supply voltage VSS, and a second terminal connected to the third node N3. In such embodiments, the seventh transistor T7 may include a gate connected to the third node N3, a first terminal which receives the first power supply voltage VDD, and a second terminal connected to the pulse output node NPO, and the eighth transistor T8 may include a gate connected to the third node N3, a first terminal which receives the second power supply voltage VSS, and a second terminal connected to the pulse output node NPO.

The feedback capacitor CFB may be connected between the first node N1 that is the input node of the plurality of inverters INV1 and INV2, and the pulse output node NPO that is the output node of the plurality of inverters INV1 and INV2. In some embodiments, the feedback capacitor CFB may include a first electrode connected to the first node N1, and a second electrode connected to the pulse output node NPO. When the pulse signal SPWM applied to the second electrode of the feedback capacitor CFB rises (or increases) from a low level to a high level, a voltage of the first electrode of the feedback capacitor CFB, or the voltage of the first node N1 also may rise (or increase). When the voltage of the first node N1 input to the plurality of inverters INV1 and INV2 rises, the pulse signal SPWM output from the plurality of inverters INV1 and INV2 may more rapidly rise. Thus, by the feedback capacitor CFB connected between the input and output nodes of the plurality of inverters INV1 and INV2, the rising time (and/or the falling time) of the pulse signal SPWM may be further improved or shortened.

The constant current generating circuit CCGC may generate the constant current having the substantially constant current level. That is, the constant current generating circuit CCGC may be a constant current source that generates the constant current. In some embodiments, as illustrated in FIG. 3, the constant current generating circuit CCGC may be implemented with a biased transistor. In an embodiment, for example, the constant current generating circuit CCGC may include a ninth transistor T9 including a gate that receives a bias voltage VBIAS, a first terminal which receives the first power supply voltage VDD, and a second terminal connected to the emission transistor (or a tenth transistor) T10. In some embodiments, the ninth transistor T9 may be a PMOS transistor. Further, in some embodiments, the ninth transistors T9 of all the pixels of the display device may receive the same bias voltage VBIAS, and the ninth transistors T9 of all the pixels may generate the constant currents having substantially a same current level. In other embodiments, the display device may include red, green and blue pixels, the ninth transistors T9 of the red pixels may receive a same red bias voltage, the ninth transistors T9 of the green pixels may receive a same green bias voltage, the ninth transistors T9 of the blue pixels may receive a same blue bias voltage, and the red, green and blue bias voltages may have different voltage levels, respectively.

The emission transistor T10 may be the tenth transistor T10 that provides the constant current generated by the ninth transistor T9 to the light emitting element EL in response to the pulse signal SPWM. In some embodiments, the tenth transistor T10 may be a PMOS transistor. The tenth transistor T10 may provide the constant current to the light emitting element EL while the pulse signal SPWM has a low level. That is, a time during which the constant current is provided to the light emitting element EL may be determined based on the pulse width of the pulse signal SPWM having the low level. Further, in some embodiments, the tenth transistor T10 may include a gate which receives the pulse signal SPWM, a first terminal connected to the second terminal of the ninth transistor T9, and a second terminal connected to the light emitting element EL.

The light emitting element EL may emit light based on the constant current provided through the tenth transistor T10. The time during which the constant current is provided to the light emitting element EL, or an emission time of the light emitting element EL may be determined based on the pulse width of the pulse signal SPWM. Further, since the pulse width of the pulse signal SPWM is determined based on (or depending on) the voltage level of the data voltage, and the emission time of the light emitting element EL is determined based on the pulse width of the pulse signal SPWM, the emission time of the light emitting element EL may be determined based on the voltage level of the data voltage. In some embodiments, the light emitting element EL may include an anode connected to the second terminal of the tenth transistor T10, and a cathode which receives the second power supply voltage VSS. In some embodiments, the light emitting element EL may be a micro-light emitting diode (μLED), but is not limited thereto. In other embodiments, the light emitting element EL may be an organic light emitting diode (OLED). In still other embodiments, the light emitting element EL may be a nano light emitting diode (NED), a quantum dot (QD) light emitting diode, an inorganic light emitting diode, or any other suitable light emitting element.

In a conventional display device, a current provided to a light emitting element is adjusted based on a gray level indicated by image data or a voltage level of a data voltage. However, a wavelength of light emitted by the light emitting element such as the μLED is shifted based on an amount of the current provided to the light emitting element. Thus, if the current provided to the light emitting element is changed, a color shift phenomenon may occur, and an image may be distorted. In the display device according to embodiments, each pixel 100 may provide the constant current to the light emitting element EL by using the constant current generating circuit CCGC. Accordingly, the color shift phenomenon may be effectively prevented in the display device according to embodiments.

As described above, the pixel 100 according to embodiments may drive the light emitting element EL based on the constant current having the substantially constant current level. Accordingly, the color shift phenomenon may be prevented in the display device including the pixel 100. Further, in the pixel 100 according to embodiments, the pulse generating circuit PGC may include the plurality of inverters INV1 and INV2 connected to each other in series, and the feedback capacitor CFB connected between the input and output nodes of the plurality of inverters INV1 and INV2 (or between the first node N1 and the pulse output node NPO). Accordingly, the rising time (and/or the falling time) of the pulse signal SPWM generated by the pulse generating circuit PGC may be improved, and an image quality of the display device may be improved.

Figure 5:
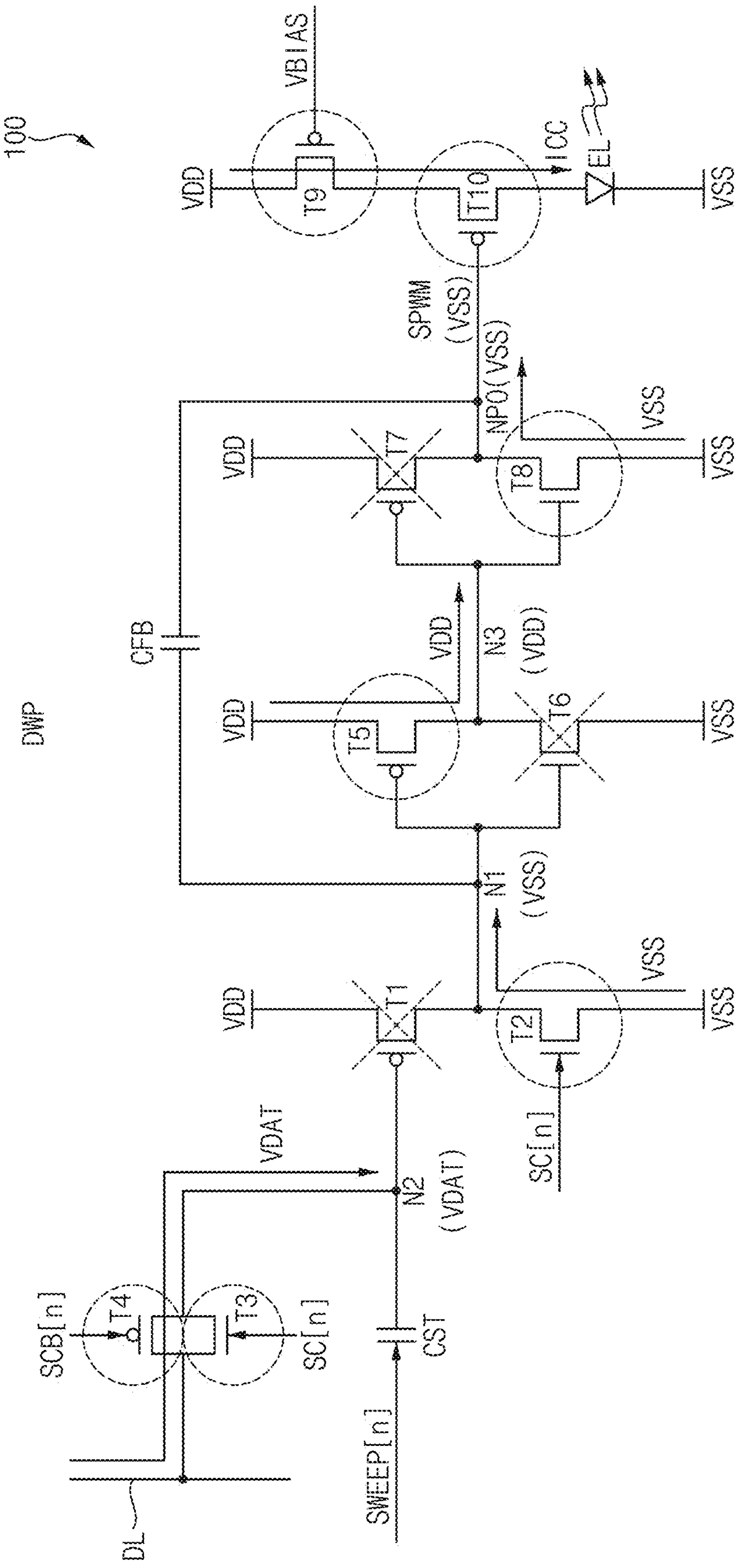
FIG. 5 is a circuit diagram for describing an example of an operation of a pixel in a data writing period.
Figure 6:
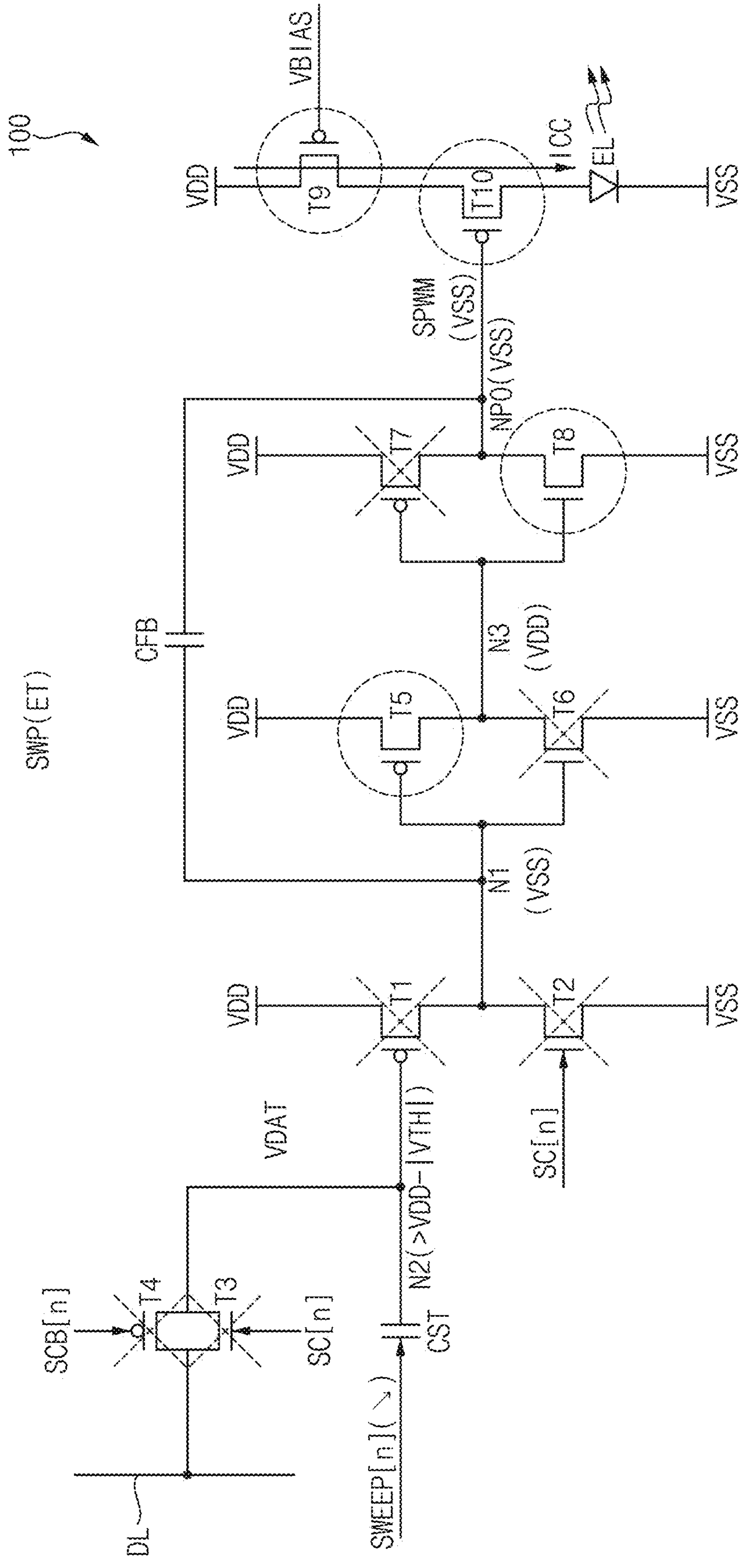
FIG. 6 is a circuit diagram for describing an example of an operation of a pixel in an emission time within a sweep period.
Figure 7:
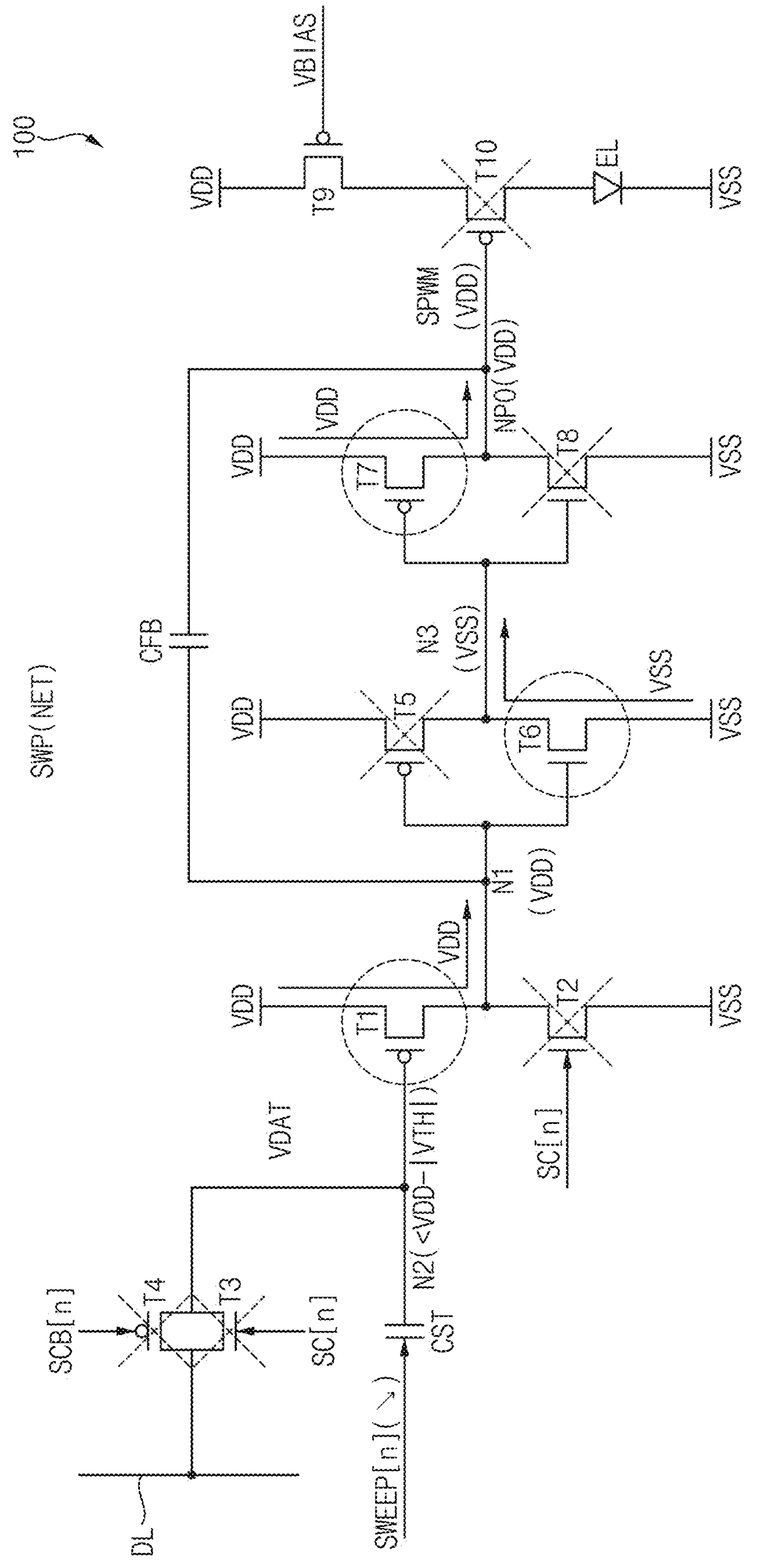
FIG. 7 is a circuit diagram for describing an example of an operation of a pixel in a non-emission time within a sweep period.

FIG. 4 is a timing diagram for describing an example of an operation of a pixel according to embodiments, FIG. 5 is a circuit diagram for describing an example of an operation of a pixel in a data writing period, FIG. 6 is a circuit diagram for describing an example of an operation of a pixel in an emission time within a sweep period, and FIG. 7 is a circuit diagram for describing an example of an operation of a pixel in a non-emission time within a sweep period.

Referring to FIGS. 1 and 4, a frame period FP for a pixel 100 may include a data writing period DWP and a sweep period SWP.

In the data writing period DWP, a scan signal SC[n] may have a high level, an inverted scan signal SCB[n] may have a low level, a data voltage VDAT may be applied to a second node N2, and a pulse signal SPWM may have a second power supply voltage VSS. In an embodiment, for example, as illustrated in FIG. 5, a third transistor T3 may be turned on in response to the scan signal SC[n] having the high level, the fourth transistor T4 may be turned on in response to the inverted scan signal SCB[n] having the low level, and the third and fourth transistors T3 and T4 may transfer the data voltage VDAT of a data line DL to the second node N2. Thus, a voltage of the second node N2 may become the data voltage VDAT. Further, a first transistor T1 may be turned off in response to the data voltage VDAT at the second node N2, and a second transistor T2 may be turned on in response to the scan signal SC[n] having the high level. Thus, the second transistor T2 may transfer the second power supply voltage VSS to a first node N1, and a voltage of the first node N1 may become the second power supply voltage VSS. A sixth transistor T6 may be turned off in response to the second power supply voltage VSS at the first node N1, and a fifth transistor T5 may be turned on in response to the second power supply voltage VSS at the first node N1. Thus, the fifth transistor T5 may transfer a first power supply voltage VDD to a third node N3, and a voltage of the third node N3 may become the first power supply voltage VDD. Further, a seventh transistor T7 may be turned off in response to the first power supply voltage VDD at the third node N3, and an eighth transistor T8 may be turned on in response to the first power supply voltage VDD at the third node N3. Thus, the eighth transistor T8 may transfer the second power supply voltage VSS to a pulse output node NPO, and a pulse signal SPWM having the second power supply voltage VSS may be output at the pulse output node NPO. A ninth transistor T9 may generate a constant current ICC based on a bias voltage VBIAS, and a tenth transistor T10 may provide the constant current ICC to a light emitting element EL in response to the pulse signal SPWM having the second power supply voltage VSS. Thus, the light emitting element EL may emit light based on the constant current ICC.

In the sweep period SWP, the scan signal SC[n] may have the low level, the inverted scan signal SCB[n] may have the high level, and a sweep signal SWEEP [n] may gradually decrease. Further, the light emitting element EL may emit light while the first transistor T1 is turned off within the sweep period SWP. In an embodiment, for example, in an emission time ET within the sweep period SWP, as illustrated in FIG. 6, the third transistor T3 may be turned off in response to the scan signal SC[n] having the low level, and the fourth transistor T4 may be turned off in response to the inverted scan signal SCB[n] having the high level. Thus, the second node N2 may be floated. Further, when the sweep signal SWEEP [n] applied to a first electrode of a storage capacitor CST gradually decreases, the voltage of the second node N2 connected to a second electrode of the storage capacitor CST also may gradually decrease. For example, when the sweep signal SWEEP [n] is decreased by a delta sweep voltage ΔSWEEP during the entire sweep period SWP, the voltage of the second node N2 also may be decreased by the delta sweep voltage ΔSWEEP during the entire sweep period SWP. The second transistor T2 may be turned off in response to the scan signal SC[n] having the low level. Further, while the voltage of the second node N2 is higher than a voltage VDD−|VTH| obtained by subtracting an absolute value |VTH| of a threshold voltage of the first transistor T1 from the first power supply voltage VDD, the first transistor T1 also may be turned off. Thus, the voltage of the first node N1 may be maintained as the second power supply voltage VSS that was applied in the data writing period DWP. Further, the fifth transistor T5 may be turned on in response to the second power supply voltage VSS at the first node N1, and the voltage of the third node N3 may be maintained as the first power supply voltage VDD. Further, the eighth transistor T8 may be turned on in response to the first power supply voltage VDD at the third node N3, and the pulse signal SPWM may be maintained as the second power supply voltage VSS. Thus, the tenth transistor T10 may provide the constant current ICC generated by the ninth transistor T9 to the light emitting element EL in response to the pulse signal SPWM having the second power supply voltage VSS, and the light emitting element EL may emit light based on the constant current ICC.

Within the sweep period SWP, when the voltage of the second node N2 decreases below the voltage VDD−|VTH| obtained by subtracting the absolute value |VTH| of the threshold voltage from the first power supply voltage VDD, the first transistor T1 may be turned on, and the light emitting element EL may not emit light. In an embodiment, for example, in a non-emission time NET within the sweep period SWP, as illustrated in FIG. 7, when the voltage of the second node N2 decreases below the voltage VDD−|VTH| obtained by subtracting the absolute value |VTH| of the threshold voltage from the first power supply voltage VDD, the first transistor T1 may be turned on. When the first transistor T1 is turned on, the first transistor T1 may transfer the first power supply voltage VDD to the first node N1, and the voltage of the first node N1 may increase from the second power supply voltage VSS to the first power supply voltage VDD. The fifth transistor T5 may be turned off in response to the first power supply voltage VDD at the first node N1, and the sixth transistor T6 may be turned on in response to the first power supply voltage VDD at the first node N1. Thus, the sixth transistor T6 may transfer the second power supply voltage VSS to the third node N3, and the voltage of the third node N3 may become the second power supply voltage VSS. Further, the eighth transistor T8 may be turned off in response to the second power supply voltage VSS at the third node N3, and the seventh transistor T7 may be turned on in response to the second power supply voltage VSS at the third node N3. Thus, the seventh transistor T7 may transfer the first power supply voltage VDD to the pulse output node NPO, and the pulse signal SPWM at the pulse output node NPO may increase or rise from the second power supply voltage VSS the first power supply voltage VDD.

Figure 8:
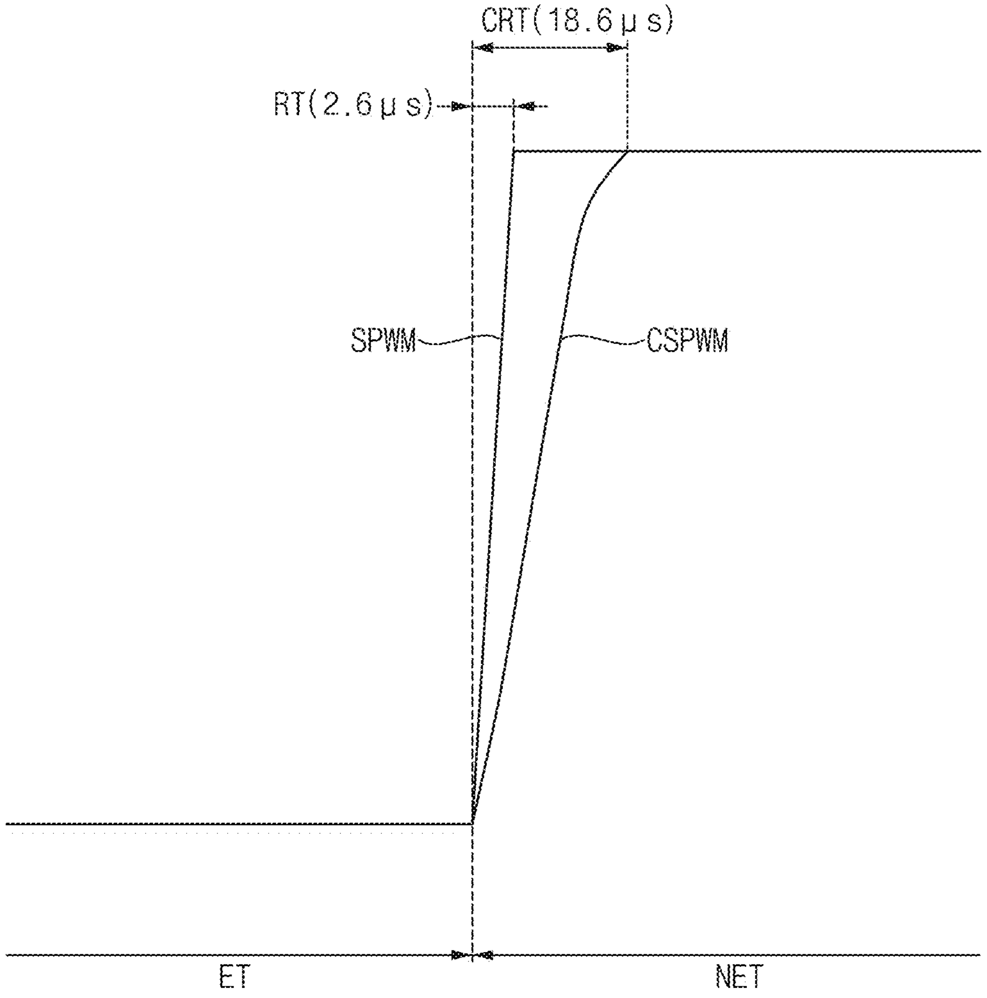
FIG. 8 is a timing diagram for describing an example of a rising time of a pulse signal generated in a pixel according to embodiments.

When the pulse signal SPWM applied to a second electrode of a feedback capacitor CFB rises from the second power supply voltage VSS to the first power supply voltage VDD, a speed at which a voltage of a first electrode of the feedback capacitor CFB, or the voltage of the first node N1 rises from the second power supply voltage VSS to the first power supply voltage VDD may be improved. Further, as the rising speed of the voltage of the first node N1 is improved or increased, a rising speed of the pulse signal SPWM by the sixth and seventh transistors T6 and T7 also may be improved or increased. For example, as illustrated in FIG. 8, a rising time CRT of a pulse signal CSPWM of a conventional pixel having no feedback capacitor may be about 18.6 microseconds (μs), but a rising time RT of the pulse signal SPWM of the pixel 100 including the feedback capacitor CFB be improved or shortened to about 2.6 μs.

Referring back to FIGS. 4 and 7, the tenth transistor T10 may be turned off in response to the pulse signal SPWM having the first power supply voltage VDD, and may not provide the constant current ICC to the light emitting element EL. Thus, the light emitting element EL may not emit light.

In such embodiments, as described above, the light emitting element EL may emit light while the pulse signal SPWM has the low level, or second power supply voltage VSS in the data writing period DWP and a portion of the sweep period SWP, and may not emit light while the pulse signal SPWM has the high level, or the first power supply voltage VDD in the remaining period of the sweep period SWP. That is, the emission time ET of the light emitting element EL may be determined based on a pulse width of the pulse signal SPWM having the second power supply voltage VSS, and the pulse width of the pulse signal SPWM may be determined based on a voltage level of the data voltage VDAT. In an embodiment, for example, as illustrated in FIG. 4, when a data voltage VDAT' having a relatively high voltage level is applied to the pixel 100, a time period during which the voltage of the second node N2 is higher than the voltage VDD−|VTH| obtained by subtracting the absolute value |VTH| of the threshold voltage from the first power supply voltage VDD may be increased, and the pulse width of the pulse signal SPWM may be increased. When the pulse width of the pulse signal SPWM is increased, within the frame period FP, the non-emission time NET' of the light emitting element EL may be decreased, the emission time ET' of the light emitting element EL may be increased, and luminance of the pixel 100 may be increased. That is, the luminance of the pixel 100 may be adjusted in a PWM method that adjusts the pulse width of the pulse signal SPWM.

Further, as described above, in the pixel 100 according to embodiments, the rising time RT (and/or a falling time) of the pulse signal SPWM may be improved by the feedback capacitor CFB, and an image quality of a display device including the pixel 100 may be improved.

Figure 9:
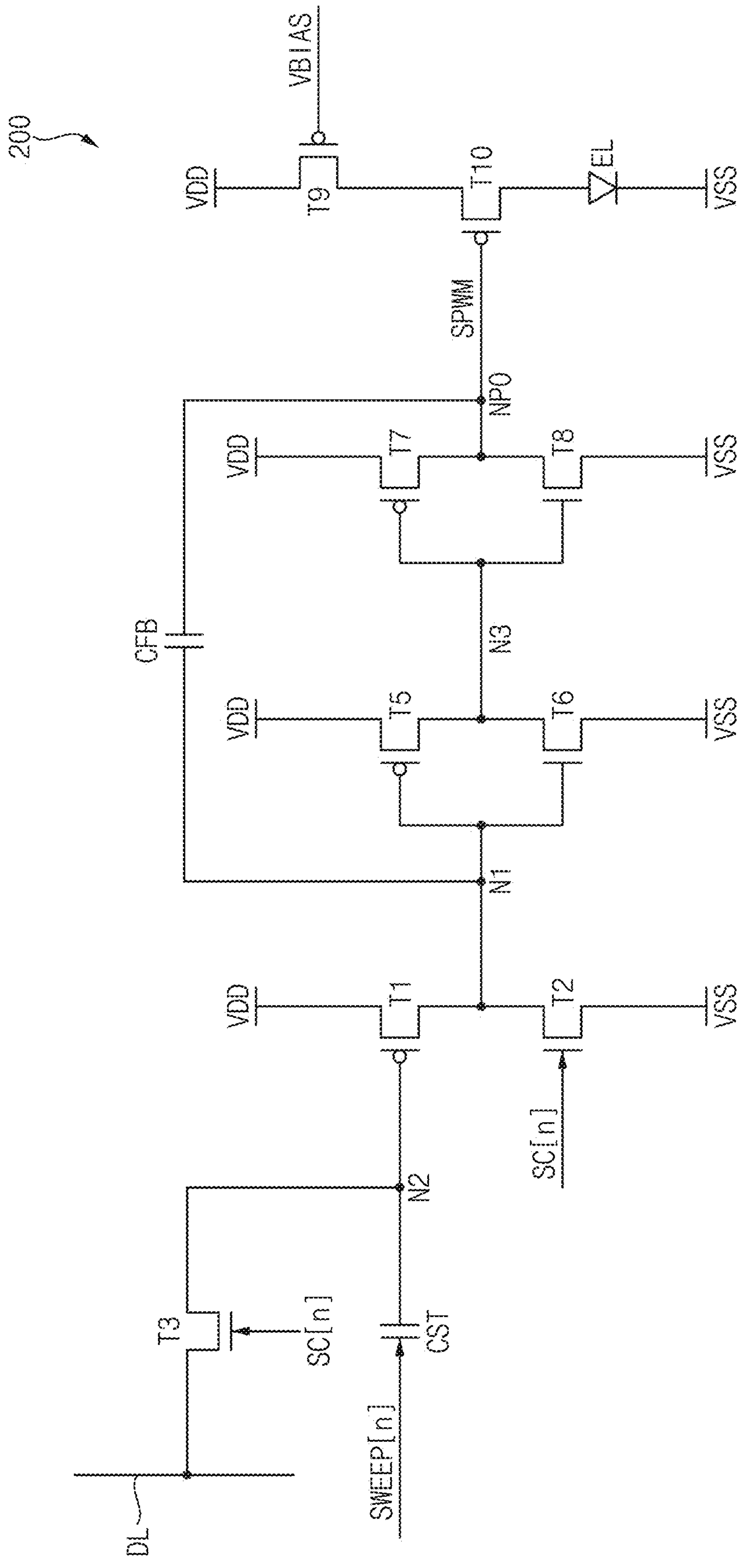
FIG. 9 is a circuit diagram illustrating a pixel of a display device according to embodiments.

FIG. 9 is a circuit diagram illustrating a pixel of a display device according to embodiments.

Referring to FIG. 9, a pixel 200 according to embodiments may include a first transistor T1, a second transistor T2, a third transistor T3, a fifth transistor T5, a sixth transistor T6, a seventh transistor T7, an eighth transistor T8, a ninth transistor T9, a tenth transistor T10, a storage capacitor CST, a feedback capacitor CFB and a light emitting element EL. The pixel 200 of FIG. 9 may have substantially the same configuration and substantially the same operation as a pixel 100 illustrated in FIGS. 1 through 3, except that the fourth transistor T4 illustrated in FIG. 1 is omitted.

In embodiments, the pixel 200 may not include the fourth transistor T4 illustrated in FIG. 1, and may transfer a data voltage of a data line DL to a second node N2 using the third transistor T3. The third transistor T3 may transfer the data voltage to the second node N2 in response to a scan signal SC[n].

Figure 10:
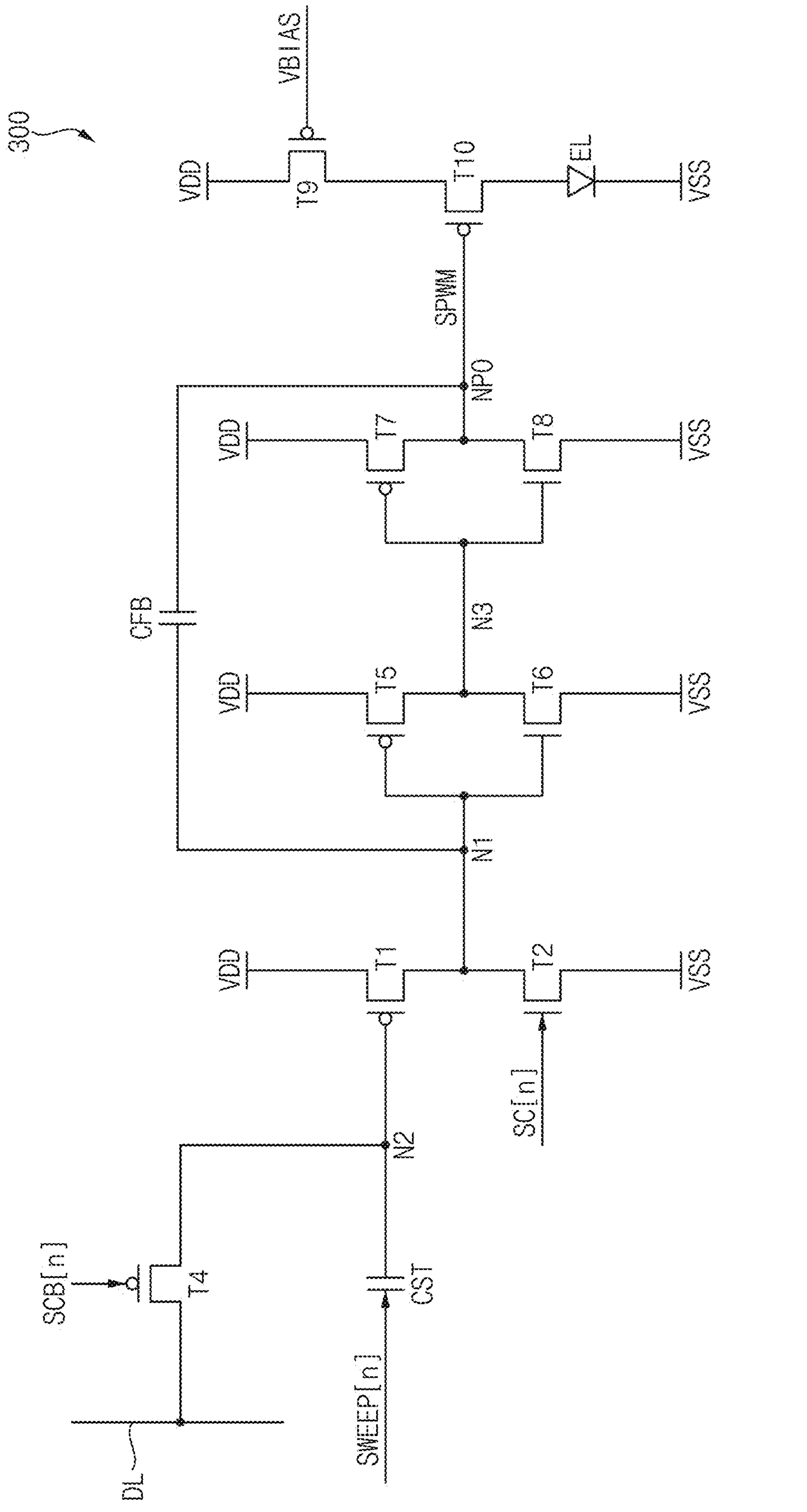
FIG. 10 is a circuit diagram illustrating a pixel of a display device according to embodiments.

FIG. 10 is a circuit diagram illustrating a pixel of a display device according to embodiments.

Referring to FIG. 10, a pixel 300 according to embodiments may include a first transistor T1, a second transistor T2, a fourth transistor T4, a fifth transistor T5, a sixth transistor T6, a seventh transistor T7, an eighth transistor T8, a ninth transistor T9, a tenth transistor T10, a storage capacitor CST, a feedback capacitor CFB and a light emitting element EL. The pixel 300 of FIG. 10 may have substantially the same configuration and substantially the same operation as a pixel 100 illustrated in FIGS. 1 through 3, except that the third transistor T3 illustrated in FIG. 1 is omitted.

In embodiments, the pixel 300 may not include the third transistor T3, and may transfer a data voltage of a data line DL to a second node N2 using the fourth transistor T4. The fourth transistor T4 may transfer the data voltage to the second node N2 in response to an inverted scan signal SCB[n].

Figure 11:
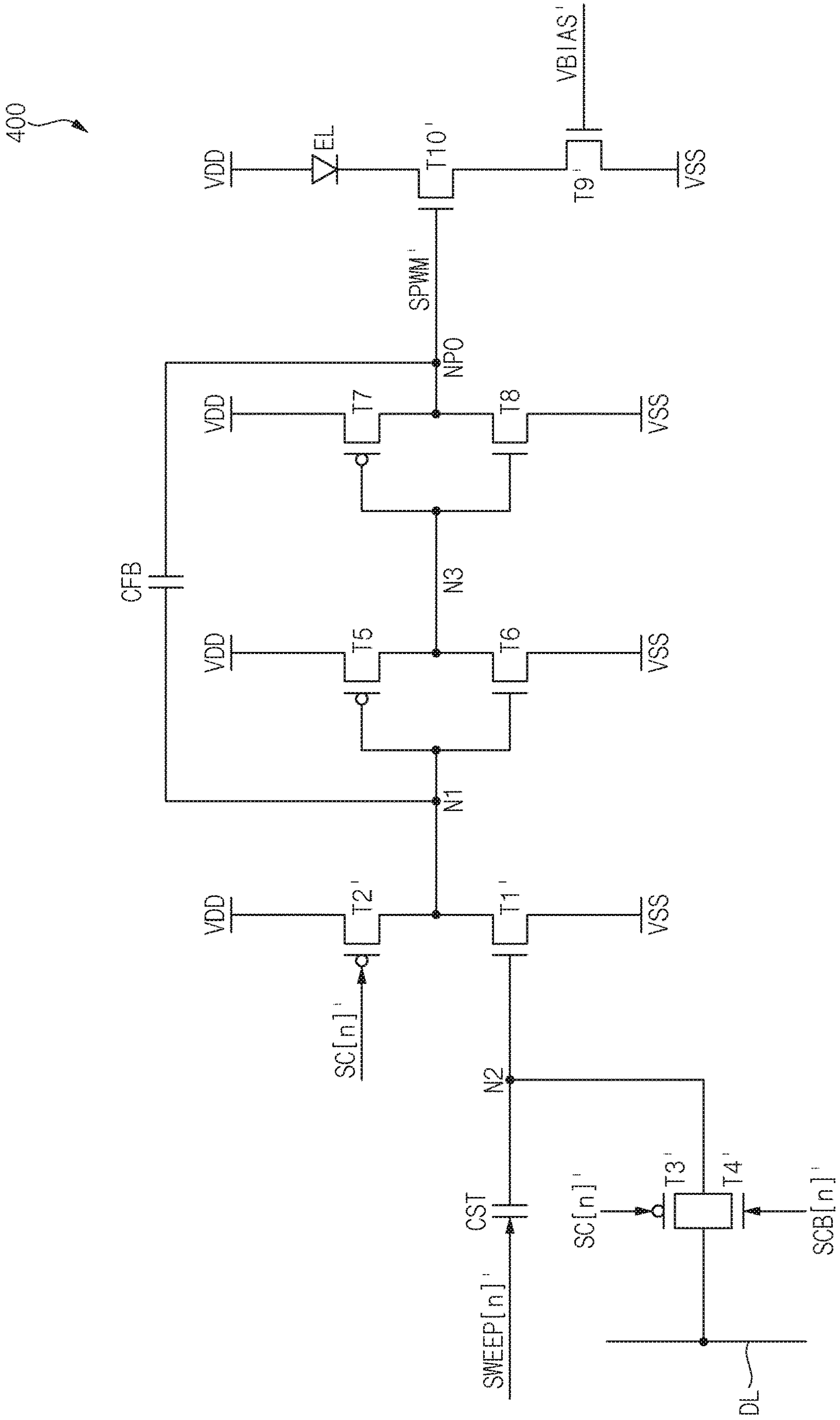
FIG. 11 is a circuit diagram illustrating a pixel of a display device according to embodiments.
Figure 12:
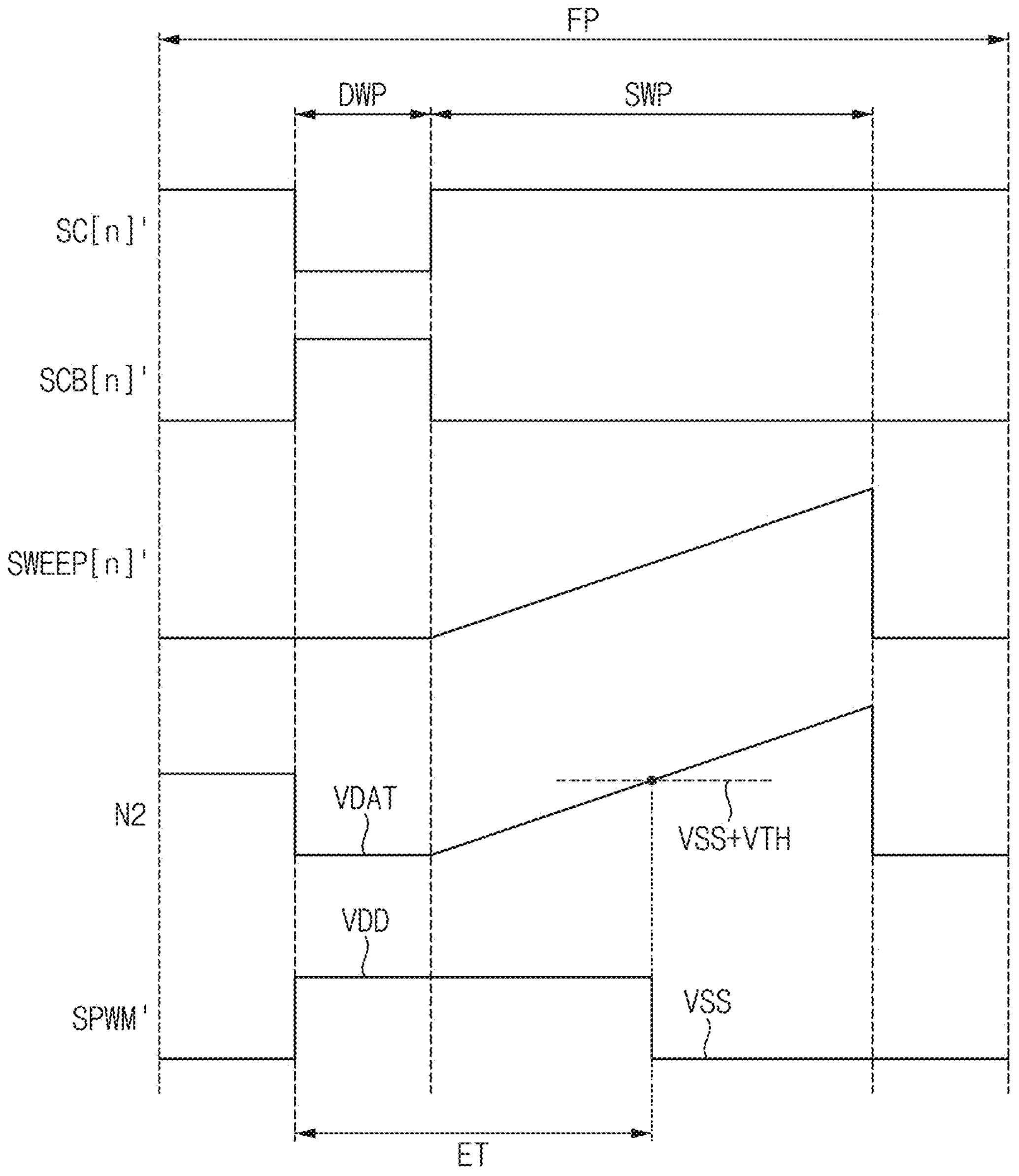
FIG. 12 is a timing diagram for describing an example of an operation of a pixel according to embodiments.

FIG. 11 is a circuit diagram illustrating a pixel of a display device according to embodiments, and FIG. 12 is a timing diagram for describing an example of an operation of a pixel according to embodiments.

Referring to FIG. 11, a pixel 400 according to embodiments may include a first transistor T1', a second transistor T2', a third transistor T3', a fourth transistor T4', a fifth transistor T5, a sixth transistor T6, a seventh transistor T7, an eighth transistor T8, a ninth transistor T9', a tenth transistor T10', a storage capacitor CST, a feedback capacitor CFB and a light emitting element EL. The pixel 400 of FIG. 11 may have a similar configuration and a similar operation to a pixel 100 illustrated in FIGS. 1 through 3, except that the pixel 400 may be implemented complementary to the pixel 100 illustrated in FIGS. 1 through 3.

In embodiments of the pixel 400 of FIG. 11, the first transistor T1', the fourth transistor T4', the ninth transistor T9' and the tenth transistor T10' may be NMOS transistors, and the second transistor T2' and the third transistor T3' may be PMOS transistors. The first transistor T1' may apply a low power supply voltage VSS as a first power supply voltage to a first node N1 in response to a voltage of a second node N2, and the second transistor T2' may apply a high power supply voltage VDD as a second power supply voltage to the first node N1 in response to a scan signal SC[n]'.

Further, as illustrated in FIG. 12, in a data writing period DWP, the scan signal SC[n]' may have a low level, and an inverted scan signal SCB[n]' may have a high level. The third transistor T3' may be turned on in response to the scan signal SC[n]' having the low level, and the fourth transistor T4' may be turned on in response to the scan signal SC[n]' having the high level. The third and fourth transistors T3' and T4' may transfer a data voltage VDAT to the second node N2.

Further, in a sweep period SWP, a voltage level of a sweep signal SWEEP [n]' may gradually increase, and the voltage of the second node N2 also may be gradually increased by the storage capacitor CST. While the voltage of the second node N2 is lower than a sum of the low power supply voltage VSS and a threshold voltage VTH of the first transistor T1', a pulse signal SPWM' may have the high power supply voltage VDD. While the pulse signal SPWM' has the high power supply voltage VDD, the tenth transistor T10' may be turned on, and the light emitting element EL may emit light based on a constant current generated by the ninth transistor T9 in response to a bias voltage VBIAS'. Further, a pulse width of the pulse signal SPWM' having the high power supply voltage VDD may be adjusted or modulated according to a voltage level of the data voltage VDAT, and an emission time ET of the light emitting element EL may be adjusted based on the pulse width of the pulse signal SPWM' having the high power supply voltage VDD. Further, in the pixel 400 according to embodiments, a falling time of the pulse signal SPWM' from the high power supply voltage VDD to the low power supply voltage VSS may be improved or shortened by the feedback capacitor CFB, and an image quality of a display device may be improved.

Figure 13:
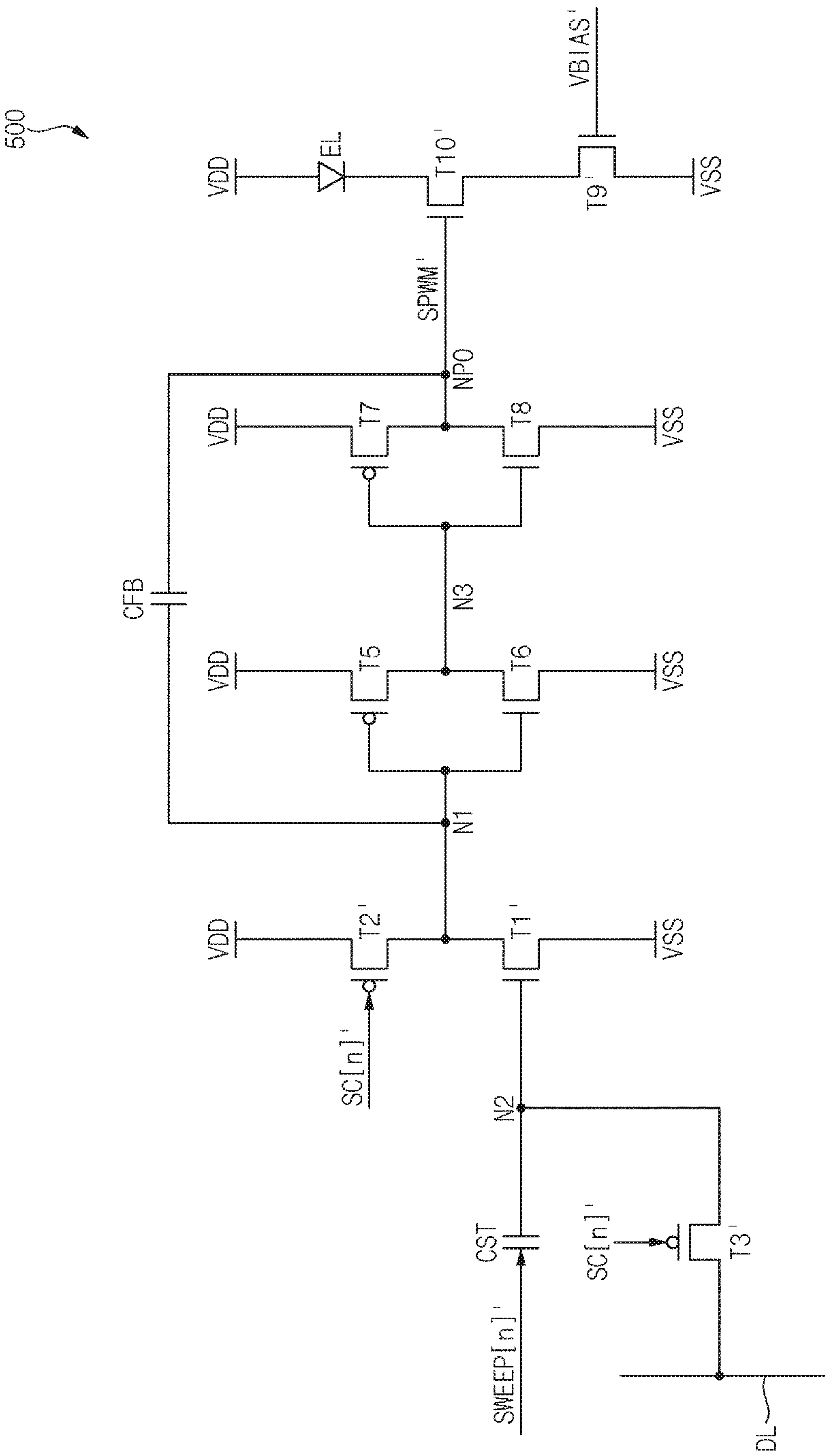
FIG. 13 is a circuit diagram illustrating a pixel of a display device according to embodiments.

FIG. 13 is a circuit diagram illustrating a pixel of a display device according to embodiments.

Referring to FIG. 13, a pixel 500 according to embodiments may include a first transistor T1', a second transistor T2', a third transistor T3', a fifth transistor T5, a sixth transistor T6, a seventh transistor T7, an eighth transistor T8, a ninth transistor T9', a tenth transistor T10', a storage capacitor CST, a feedback capacitor CFB and a light emitting element EL. The pixel 500 of FIG. 13 may have substantially the same configuration and substantially the same operation as a pixel 400 of FIG. 11, except that the fourth transistor T4' illustrated in FIG. 11 is omitted.

In embodiments, the pixel 500 may not include the fourth transistor T4', and may transfer a data voltage of a data line DL to a second node N2 using the third transistor T3'. The third transistor T3' may transfer the data voltage to the second node N2 in response to a scan signal SC[n]'.

Figure 14:
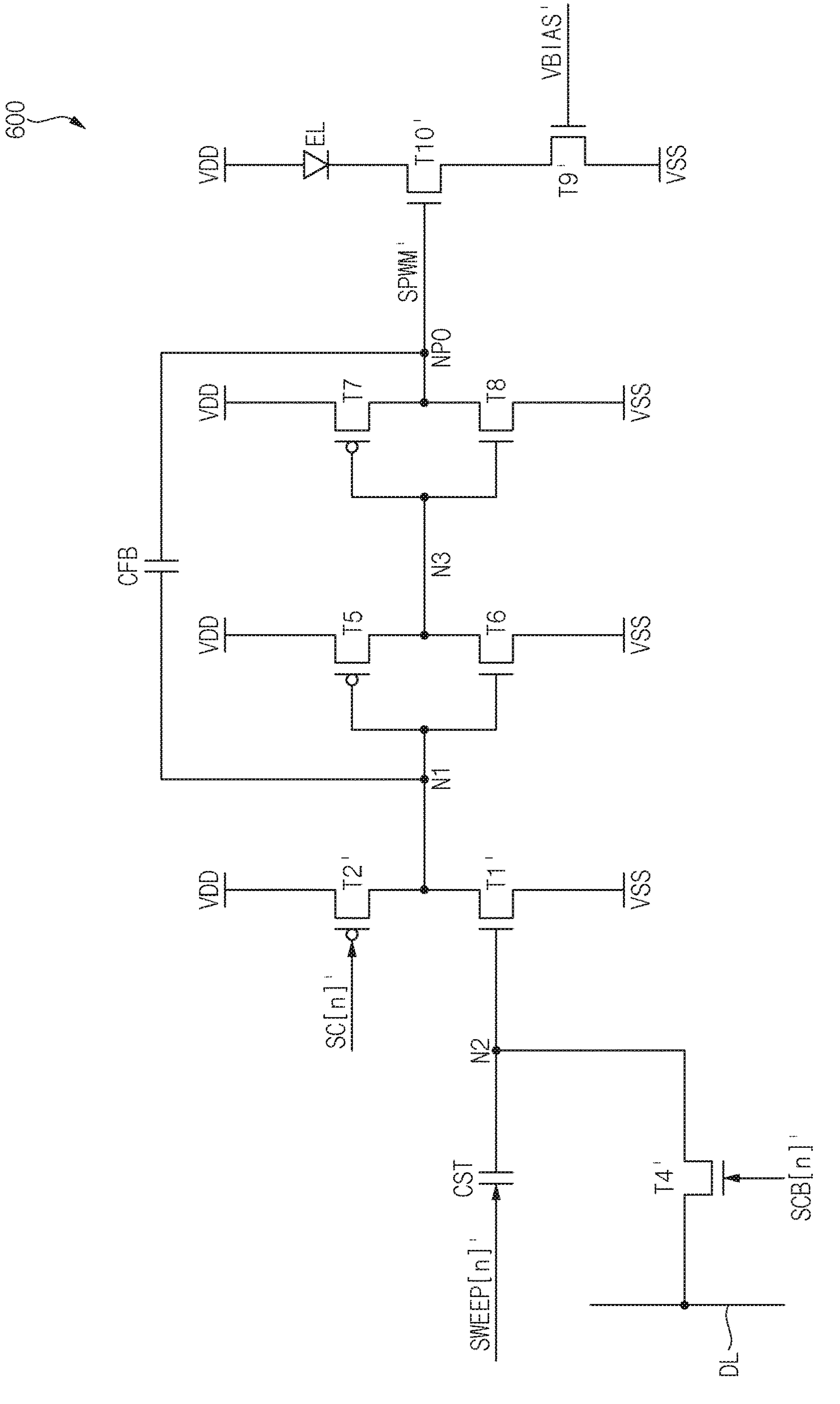
FIG. 14 is a circuit diagram illustrating a pixel of a display device according to embodiments.

FIG. 14 is a circuit diagram illustrating a pixel of a display device according to embodiments.

Referring to FIG. 14, a pixel 600 according to embodiments may include a first transistor T1', a second transistor T2', a fourth transistor T4', a fifth transistor T5, a sixth transistor T6, a seventh transistor T7, an eighth transistor T8, a ninth transistor T9', a tenth transistor T10', a storage capacitor CST, a feedback capacitor CFB and a light emitting element EL. The pixel 600 of FIG. 14 may have substantially the same configuration and substantially the same operation as a pixel 400 of FIG. 11, except that the third transistor T3' illustrated in FIG. 11 is omitted.

In embodiments, the pixel 600 may not include the third transistor T3', and may transfer a data voltage of a data line DL to a second node N2 using the fourth transistor T4'. The fourth transistor T4' may transfer the data voltage to the second node N2 in response to an inverted scan signal SCB[n]'.

Figure 15:
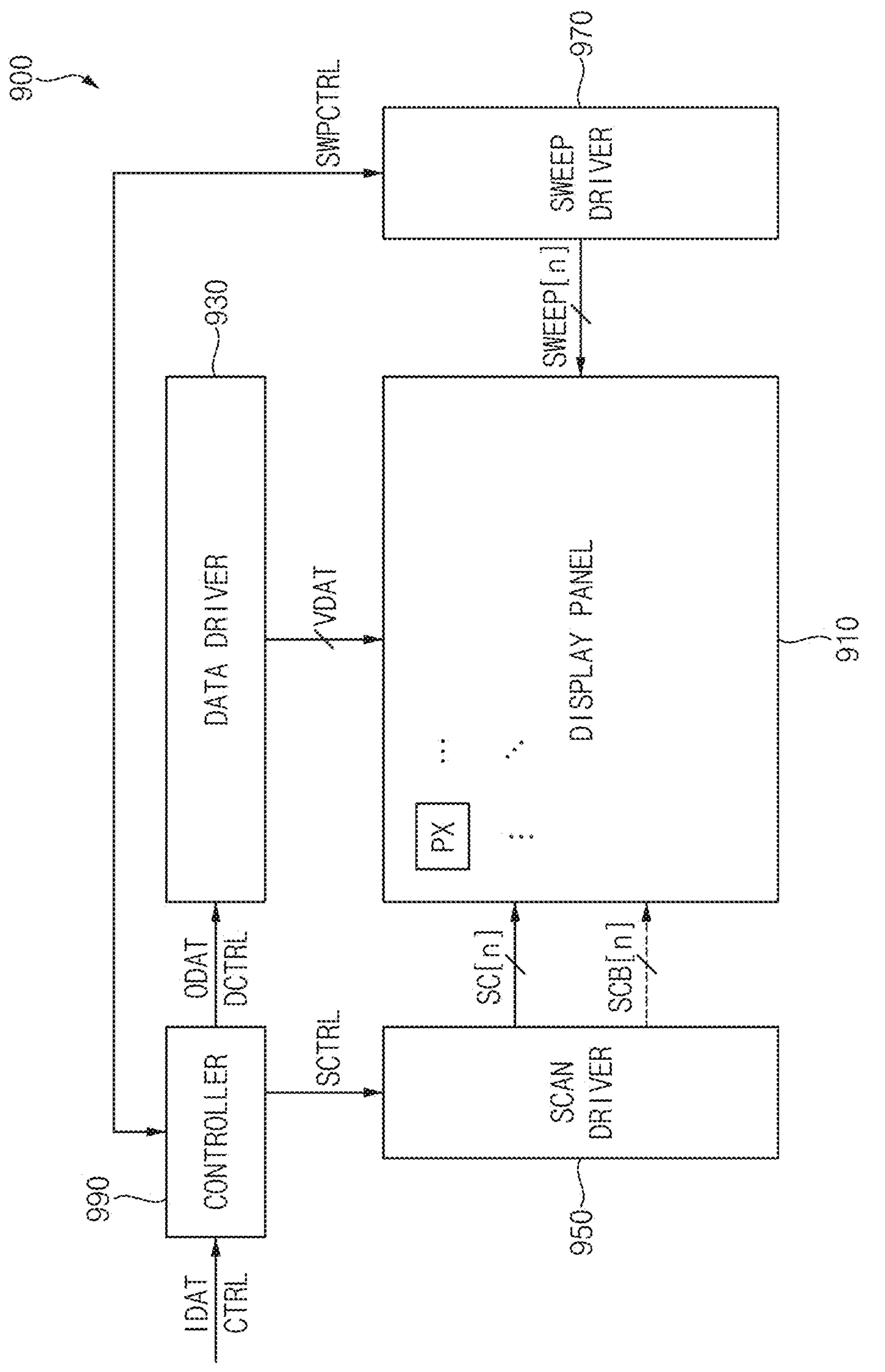
FIG. 15 is a block diagram illustrating a display device according to embodiments.

FIG. 15 is a block diagram illustrating a display device according to embodiments.

Referring to FIG. 15, a display device 900 according to embodiments may include a display panel 910 that includes a plurality of pixels PX, a data driver 930 that provides data voltages VDAT to the plurality of pixels PX, a scan driver 950 that provides scan signals SC[n] and/or inverted scan signals SCB[n] to the plurality of pixels PX, a sweep driver 970 that provides sweep signals SWEEP [n] to the plurality of pixels PX, and a controller 990 that controls the data driver 930, the scan driver 950 and the sweep driver 970.

The display panel 910 may include the plurality of pixels PX. According to embodiments, each pixel PX of the display panel 910 may be a pixel 100 of FIG. 1, a pixel 200 of FIG. 9, a pixel 300 of FIG. 10, a pixel 400 of FIG. 11, a pixel 500 of FIG. 13 or a pixel 600 of FIG. 14. In each pixel PX, a pulse generating circuit may include a plurality of inverters connected to each other in series, and a feedback capacitor connected between input and output nodes of the plurality of inverters. Accordingly, a rising (and/or falling) time of a pulse signal may be improved, and an image quality of the display device 900 may be improved.

The data driver 930 may provide the data voltages VDAT to the plurality of pixels PX based on a data control signal DCTRL and output image data ODAT received from the controller 990. In some embodiments, the data control signal DCTRL may include, but is not limited to, an output data enable signal, a horizontal start signal and a load signal. Further, in some embodiments, the data driver 930 and the controller 990 may be implemented as a single integrated circuit, and the single integrated circuit may be referred to as a timing controller embedded data driver (TED). In other embodiments, the data driver 930 and the controller 990 may be implemented as separate integrated circuits.

The scan driver 950 may sequentially provide the scan signals SC[n] and/or the inverted scan signals SCB[n] to the plurality of pixels PX on a row-by-row basis based on a scan control signal SCTRL received from the controller 990. In some embodiments, the scan control signal SCTRL may include, but is not limited to, a scan start signal and a scan clock signal. In some embodiments, the scan driver 950 may be integrated or formed in the display panel 910. In other embodiments, the scan driver 950 may be implemented as one or more integrated circuits.

The sweep driver 970 may sequentially provide the sweep signals SWEEP [n] to the plurality of pixels PX on a row-by-row basis based on a sweep control signal SWPCTRL received from the controller 990. Further, the sweep signal SWEEP [n] may gradually decrease (or increase) in a sweep period. In some embodiments, the sweep control signal SWPCTRL may include, but is not limited to, a sweep clock signal. Further, in some embodiments, the sweep driver 970 may be integrated or formed in the display panel 910. In other embodiments, the sweep driver 970 may be implemented as one or more integrated circuits.

The controller 990 (e.g., a timing controller) may receive input image data IDAT and a control signal CTRL from an external host processor (e.g., a graphics processing unit (GPU), an application processor (AP) or a graphics card). In some embodiments, the control signal CTRL may include, but is not limited to, a vertical synchronization signal, a horizontal synchronization signal, an input data enable signal and a master clock signal. The controller 990 may generate the output image data ODAT, the data control signal DCTRL, the scan control signal SCTRL and the sweep control signal SWPCTRL based on the input image data IDAT and the control signal CTRL. The controller 990 may control the data driver 930 by providing the output image data ODAT and the data control signal DCTRL to the data driver 930, may control the scan driver 950 by providing the scan control signal SCTRL to the scan driver 950, and may control the sweep driver 970 by providing the sweep control signal SWPCTRL to the sweep driver 970.

In the display device 900 according to embodiments, each pixel PX may drive a light emitting element based on a constant current having a constant current level. Thus, a color shift phenomenon may be effectively prevented in the display device. 900. Each pixel PX may include the feedback capacitor connected between the input and output nodes of the plurality of inverters that generate the pulse signal. Accordingly, the rising (and/or falling) time of the pulse signal may be improved, and the image quality of the display device 900 may be improved.

Figure 16:
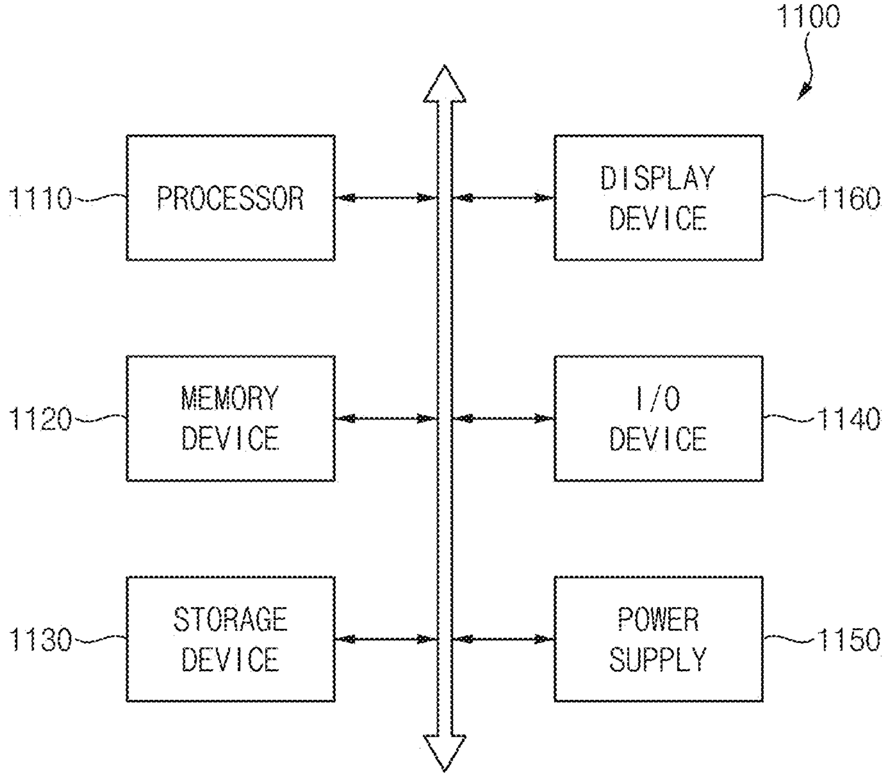
FIG. 16 is a block diagram illustrating an electronic device including a display device according to embodiments.

FIG. 16 is a block diagram illustrating an electronic device including a display device according to embodiments.

Referring to FIG. 16, an embodiment of an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. In embodiments, for example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In embodiments of the display device 1160, each pixel may drive a light emitting element based on a constant current having a constant current level. Thus, a color shift phenomenon may be effectively prevented in the display device. 1160. Further, in the display device 1160, each pixel may include a feedback capacitor connected between input and output nodes of a plurality of inverters that generate a pulse signal. Accordingly, a rising (and/or falling) time of the pulse signal may be improved, and the image quality of the display device 1160 may be improved.

Embodiments of the invention may be applied to any display device 1160 and any electronic device 1100 including the display device 1160, for example, a smart phone, a wearable electronic device, a mobile phone, a television (TV) (e.g., a digital TV, a three-dimensional (3D) TV, etc.), a personal computer (PC) (e.g., a tablet computer, a laptop computer, etc.), a home appliance, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel of a display device, the pixel comprising:

a light emitting element;

a constant current generating circuit which generates a constant current;

a pulse generating circuit which generates a pulse signal; and an emission transistor which provides the constant current to the light emitting element in response to the pulse signal, wherein the pulse generating circuit includes:

a plurality of inverters connected to each other in series, wherein the plurality of inverters outputs the pulse signal at a pulse output node based on a voltage of a first node;

a feedback capacitor including a first electrode connected to the first node, and a second electrode connected to the pulse output node;

a first transistor which applies a high power supply voltage to the first node in response to a voltage of a second node; and a second transistor which applies a low power supply voltage to the first node in response to a scan signal.

2. The pixel of claim 1, wherein an emission time of the light emitting element is determined based on a pulse width of the pulse signal.

3. The pixel of claim 1, wherein the first transistor includes a gate connected to the second node, a first terminal which receives the high power supply voltage, and a second terminal connected to the first node, and wherein the second transistor includes a gate which receives the scan signal, a first terminal which receives the low power supply voltage, and a second terminal connected to the first node.

4. The pixel of claim 1, wherein the first transistor is a P-type metal oxide semiconductor transistor, and wherein the second transistor is an N-type metal oxide semiconductor transistor.

5. The pixel of claim 1, wherein the first transistor is an N-type metal oxide semiconductor transistor, and wherein the second transistor is a P-type metal oxide semiconductor transistor.

6. The pixel of claim 1, wherein the pulse generating circuit further includes:

a third transistor which applies a data voltage to the second node in response to the scan signal.

7. The pixel of claim 1, wherein the pulse generating circuit further includes:

a fourth transistor which applies a data voltage to the second node in response to an inverted scan signal.

8. The pixel of claim 1, wherein the pulse generating circuit further includes:

a third transistor which applies a data voltage to the second node in response to the scan signal; and a fourth transistor which applies the data voltage to the second node in response to an inverted scan signal.

9. The pixel of claim 8, wherein the third transistor includes a gate which receives the scan signal, a first terminal connected to the second node, and a second terminal which receives the data voltage, and wherein the fourth transistor includes a gate which receives the inverted scan signal, a first terminal which receives the data voltage, and a second terminal connected to the second node.

10. The pixel of claim 8, wherein the third transistor is a P-type metal oxide semiconductor transistor, and wherein the fourth transistor is an N-type metal oxide semiconductor transistor.

11. The pixel of claim 8, wherein the third transistor is an N-type metal oxide semiconductor transistor, and wherein the fourth transistor is a P-type metal oxide semiconductor transistor.

12. The pixel of claim 8, wherein the pulse generating circuit further includes:

a storage capacitor including a first electrode which receives a sweep signal, and a second electrode connected to the second node.

13. The pixel of claim 12, wherein a voltage level of the sweep signal gradually decreases during a sweep period.

14. The pixel of claim 12, wherein a voltage level of the sweep signal gradually increases during a sweep period.

15. The pixel of claim 12, wherein the plurality of inverters include:

a first inverter which inverts the voltage of the first node, and outputs an inverted voltage to a third node; and a second inverter which inverts a voltage of the third node, and outputs the pulse signal at the pulse output node.

16. The pixel of claim 15, wherein the first inverter includes:

a fifth transistor including a gate connected to the first node, a first terminal which receives the high power supply voltage, and a second terminal connected to the third node; and a sixth transistor including a gate connected to the first node, a first terminal which receives the low power supply voltage, and a second terminal connected to the third node, and wherein the second inverter includes:

a seventh transistor including a gate connected to the third node, a first terminal which receives the high power supply voltage, and a second terminal connected to the pulse output node; and an eighth transistor including a gate connected to the third node, a first terminal which receives the low power supply voltage, and a second terminal connected to the pulse output node.

17. The pixel of claim 16, wherein the fifth transistor and the seventh transistor are P-type metal oxide semiconductor transistors, and wherein the sixth transistor and the eighth transistor are N-type metal oxide semiconductor transistors.

18. A pixel of a display device, the pixel comprising:

a first transistor including a gate connected to a second node, a first terminal which receives a first power supply voltage, and a second terminal connected to a first node;

a second transistor including a gate which receives a scan signal, a first terminal which receives a second power supply voltage, and a second terminal connected to the first node;

a third transistor including a gate which receives the scan signal, a first terminal connected to the second node, and a second terminal which receives a data voltage;

a fourth transistor including a gate which receives an inverted scan signal, a first terminal which receives the data voltage, and a second terminal connected to the second node;

a storage capacitor including a first electrode which receives a sweep signal, and a second electrode connected to the second node;

a fifth transistor including a gate connected to the first node, a first terminal which receives the first power supply voltage, and a second terminal connected to a third node;

a sixth transistor including a gate connected to the first node, a first terminal which receives the second power supply voltage, and a second terminal connected to the third node;

a seventh transistor including a gate connected to the third node, a first terminal which receives the first power supply voltage, and a second terminal connected to a pulse output node;

an eighth transistor including a gate connected to the third node, a first terminal which receives the second power supply voltage, and a second terminal connected to the pulse output node;

a feedback capacitor including a first electrode connected to the first node, and a second electrode connected to the pulse output node;

a ninth transistor including a gate which receives a bias voltage, a first terminal which receives the first power supply voltage, and a second terminal;

a tenth transistor including a gate connected to the pulse output node, a first terminal connected to the second terminal of the ninth transistor, and a second terminal; and a light emitting element including an anode connected to the second terminal of the tenth transistor, and a cathode which receives the second power supply voltage.

19. A display device comprising:

a display panel including a plurality of pixels;

a data driver which provides a data voltage to each of the plurality of pixels;

a scan driver which provides a scan signal and an inverted scan signal to each of the plurality of pixels;

a sweep driver which provides a sweep signal to each of the plurality of pixels; and a controller which control the data driver, the scan driver and the sweep driver, wherein each of the plurality of pixels includes:

a light emitting element;

a constant current generating circuit which generates a constant current;

a pulse generating circuit which generates a pulse signal; and an emission transistor which provides the constant current to the light emitting element in response to the pulse signal, and wherein the pulse generating circuit includes:

a plurality of inverters connected to each other in series, wherein the plurality of inverters outputs the pulse signal at a pulse output node based on a voltage of a first node;

a feedback capacitor including a first electrode connected to the first node, and a second electrode connected to the pulse output node;

a third transistor which applies the data voltage to a second node in response to the scan signal; and, a fourth transistor which applies the data voltage to the second node in response to the inverted scan signal.

20. An electronic device comprising:

a processor configured to provide input image data; and a display device configured to receive the input image data, and to display an image based on the input image data, the display device including:

a display panel including a plurality of pixels;

a data driver which provides a data voltage to each of the plurality of pixels;

a scan driver which provides a scan signal to each of the plurality of pixels;

a sweep driver which provides a sweep signal to each of the plurality of pixels; and a controller which control the data driver, the scan driver and the sweep driver, wherein each of the plurality of pixels includes:

a light emitting element;

a constant current generating circuit which generates a constant current;

a pulse generating circuit which generates a pulse signal; and an emission transistor which provides the constant current to the light emitting element in response to the pulse signal, and wherein the pulse generating circuit includes:

a plurality of inverters connected to each other in series, wherein the plurality of inverters outputs the pulse signal at a pulse output node based on a voltage of a first node;

a feedback capacitor including a first electrode connected to the first node, and a second electrode connected to the pulse output node;

a first transistor which applies a high power supply voltage to the first node in response to a voltage of a second node; and a second transistor which applies a low power supply voltage to the first node in response to the scan signal.

* * * * *